Aug. 21, 1962    J. E. LYDLE    3,050,110
CIRCUMFERENTIALLY TRAVELING TIRE MOUNTING TOOL
Filed July 1, 1957    6 Sheets-Sheet 1
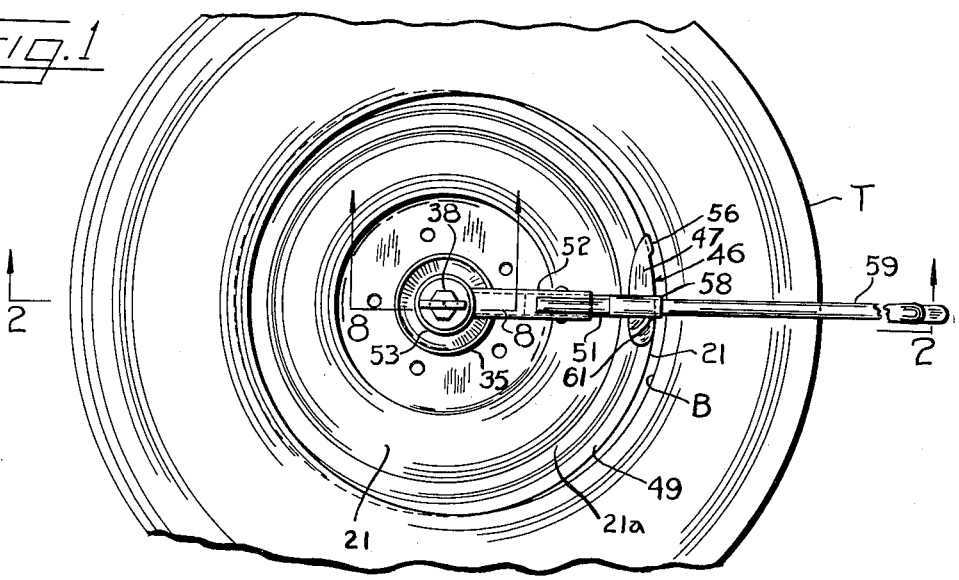
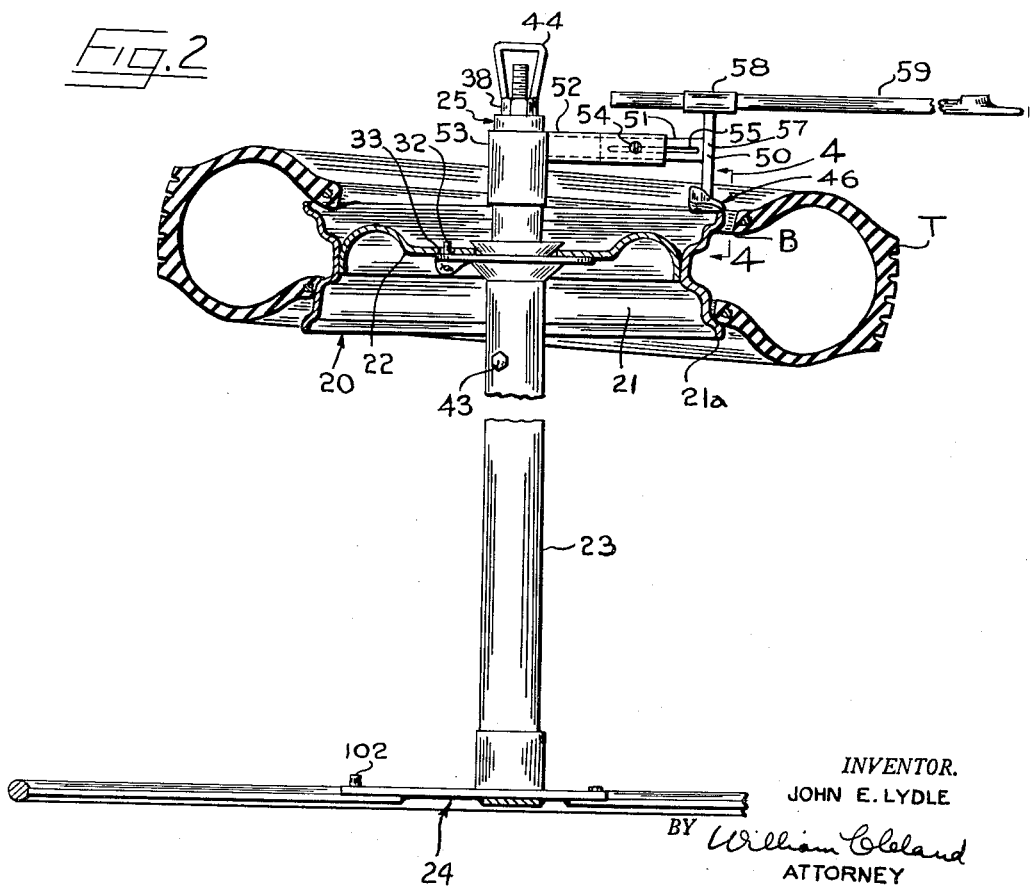
*INVENTOR.*
JOHN E. LYDLE
BY William Cleland
ATTORNEY

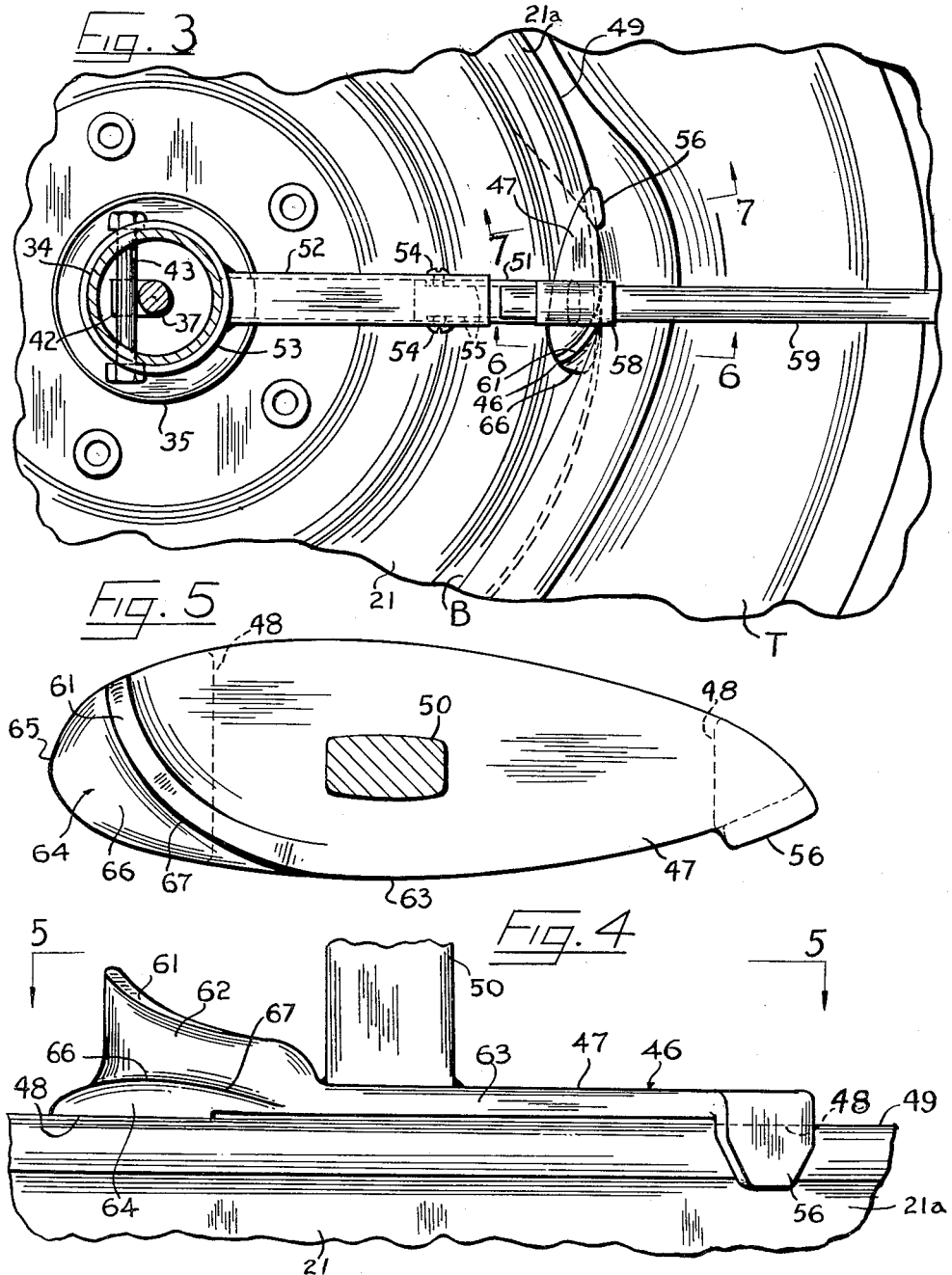

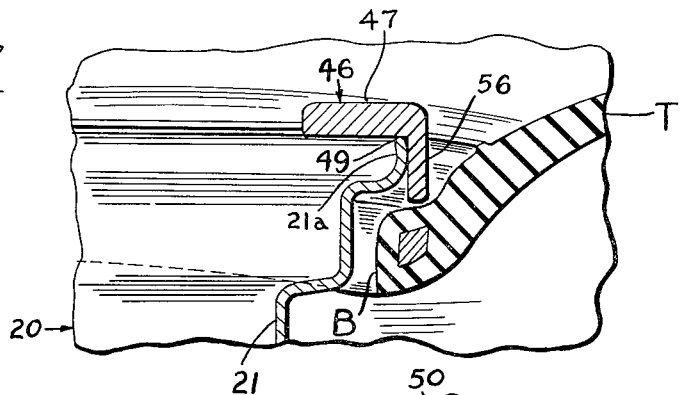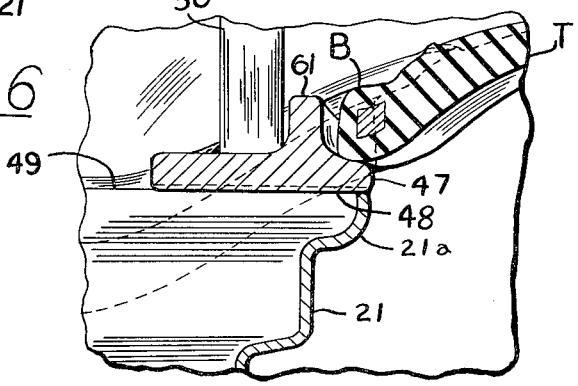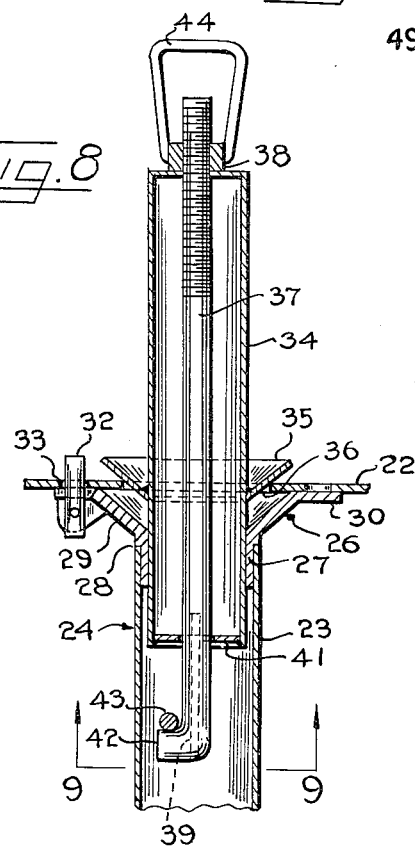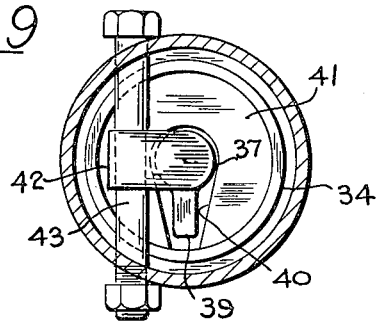

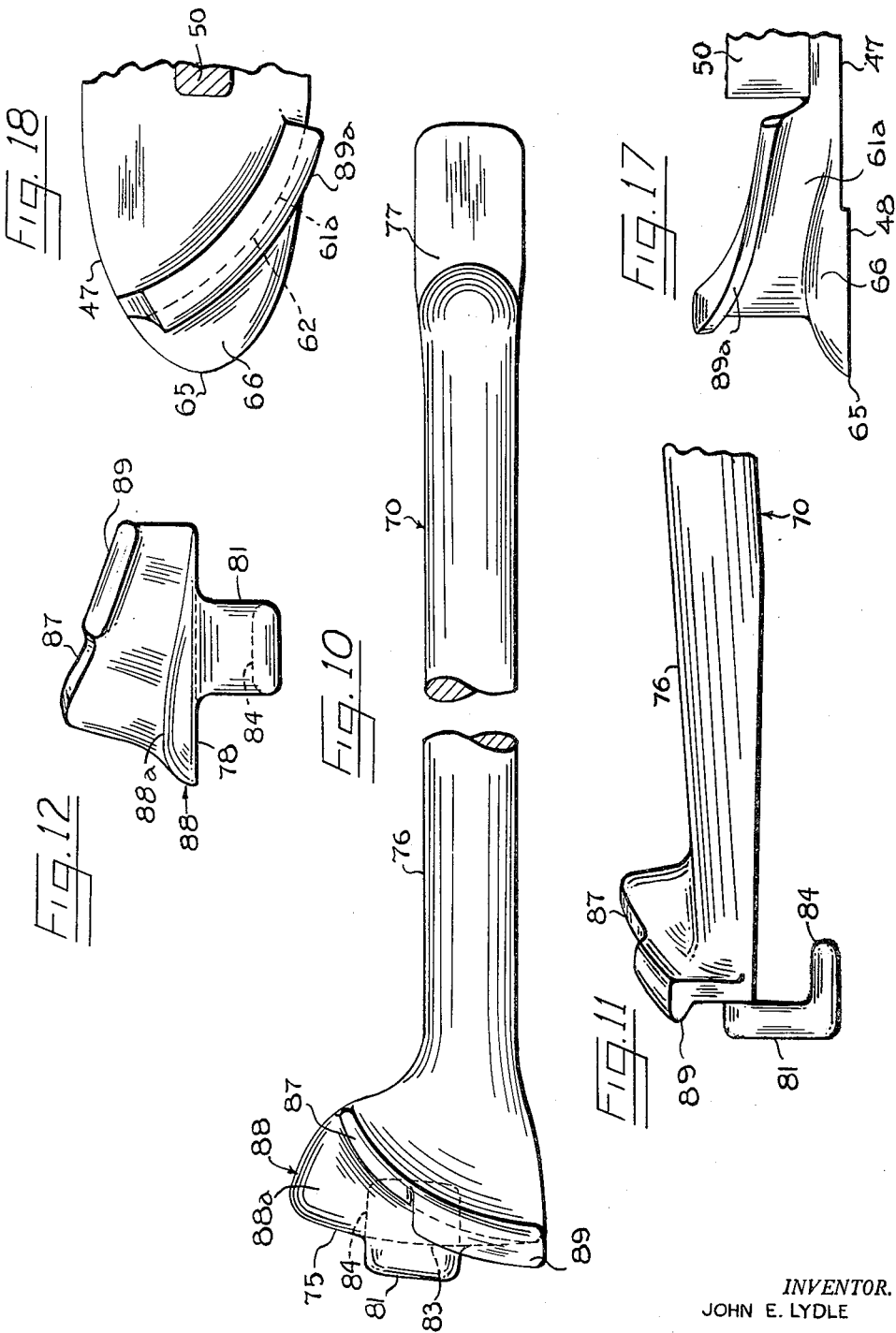

Aug. 21, 1962     J. E. LYDLE     3,050,110
CIRCUMFERENTIALLY TRAVELING TIRE MOUNTING TOOL
Filed July 1, 1957     6 Sheets-Sheet 5

*INVENTOR.*
JOHN E. LYDLE
BY William Cleland
ATTORNEY

Aug. 21, 1962 J. E. LYDLE 3,050,110
CIRCUMFERENTIALLY TRAVELING TIRE MOUNTING TOOL
Filed July 1, 1957 6 Sheets-Sheet 6
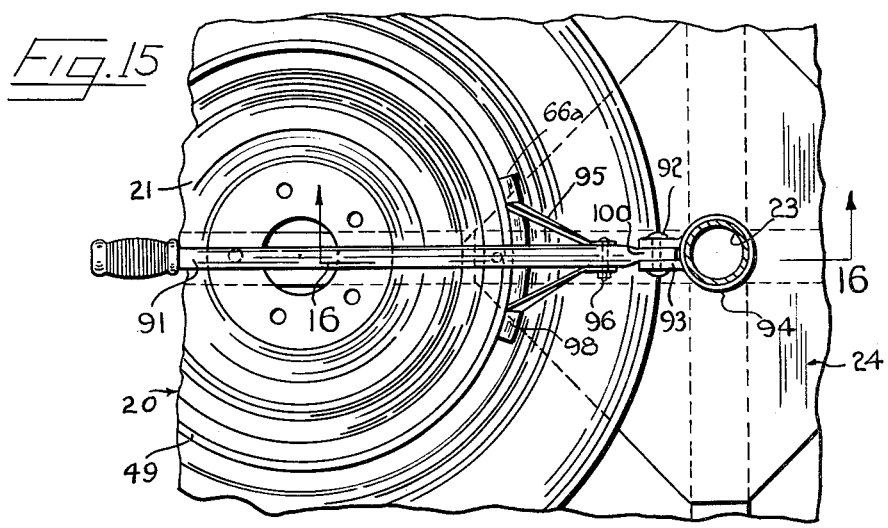
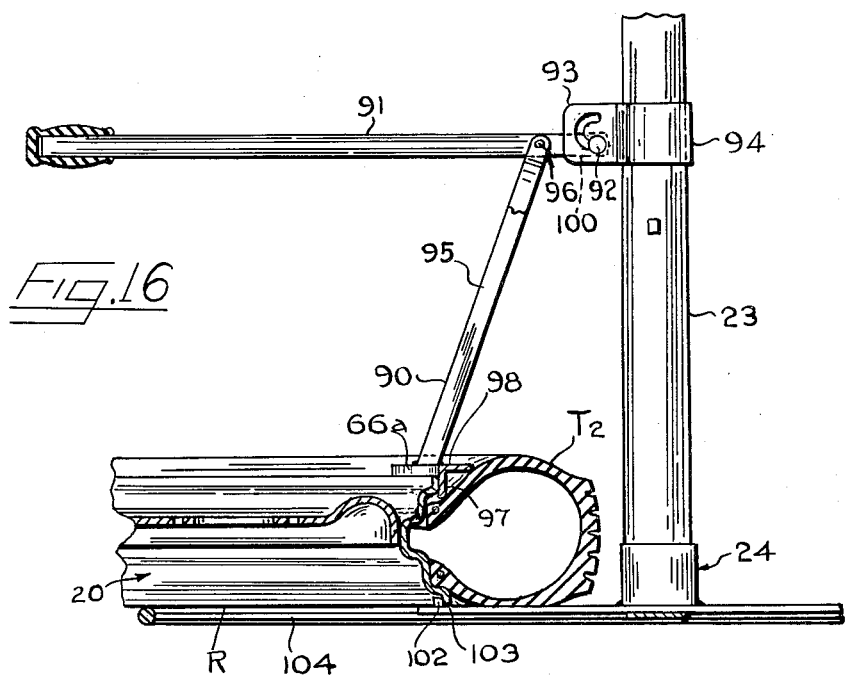
*INVENTOR.*
JOHN E. LYDLE
BY *William Cleland*
ATTORNEY United States Patent Office 3,050,110
Patented Aug. 21, 1962

3,050,110
CIRCUMFERENTIALLY TRAVELING TIRE
MOUNTING TOOL
John E. Lydle, Akron, Ohio, assignor to The Ken-Tool
Mfg. Company, Akron, Ohio, a partnership
Filed July 1, 1957, Ser. No. 668,970
2 Claims. (Cl. 157—1.24)

This invention relates to tire changing equipment, and in particular to apparatus for mounting and demounting pneumatic tires with respect to drop-center rims thereof.

One object of the invention is to provide tire mounting equipment including an improved tire bead engaging device movable in an arc to guide the tire bead past the edge of the rim flange, without scuffing contact therewith which might otherwise damage rubberized portions of the bead, which for example are important for effective sealing contact with the rim to prevent leakage of pressurized air from tubeless tires.

Another object of the invention is to provide a tire mounting tool of the character described in the last paragraph, wherein improved means is provided for preventing accidental slippage of the tire bead over the bead-engaging part of the tool.

Another object of the invention is to provide a manually operable tire-changing tool of the character described, which is simple and easy to mount on either existing or new tire-supporting equipment for tire mounting or demounting operations with respect to a wheel and rim assembly.

Another object of the invention is to provide a quickly attachable adaptor which has a double purpose of rotatably supporting a tire-working tool and self-centeringly supporting the wheel and rim assembly of a tire to be worked upon.

Still another object of the invention is to provide an improved tire mounting tool in a unitary form which is adaptable for use with substantially any existing wheel-supporting means having a central post extension thereon for use as a fulcruming part.

Another object of the invention is to provide tire changing equipment having a tire demounting device, including improved means for breaking the seal between the tire bead and the rim seat thereof, and also including leverage means which is adjustable to accommodate rims of different widths.

Other objects of the invention will be manifest from the following brief description and the accompanying drawings.

Of the accompanying drawings:

FIGURE 1 is a top plan view, partly broken away, illustrating a tire demounting equipment embodying the features of the invention, a tubeless tire being shown in a position in which the lowermost annular bead thereof has already been mounted within the rim and the upper bead is in a preliminary position with respect to a bead guiding tool, preparatory to forcing the bead over the edge of a wheel rim.

FIGURE 2 is a vertical cross-section taken substantially on the line 2—2 of FIGURE 1.

FIGURE 3 is an enlarged fragmentary plan view corresponding to a portion of FIGURE 1, and partly broken away in cross-section, illustrating operation of the tool by which the uppermost tire bead is urged over the corresponding wheel rim flange, into the drop-center portion of the rim.

FIGURE 4 is an enlarged fragmentary detail view of the bead-guiding tool or shoe, substantially as viewed on the line 4—4 of FIGURE 2.

FIGURE 5 is a horizontal cross-section, taken substantially on the line 5—5 of FIGURE 4.

FIGURES 6 and 7 are fragmentary cross-sections, on the same scale as FIGURES 4 and 5, taken substantially on the lines 6—6 and 7—7 respectively, of FIGURE 3, the same illustrating the manner in which the improved bead-engaging tool or shoe guides the tire bead inwardly around the edge of usual rim flange without touching the same.

FIGURE 8 is an enlarged fragmentary cross-section taken substantially on the line 8—8 of FIGURE 1, illustrating an improved adaptor for self-centeringly supporting the wheel.

FIGURE 9 is a further enlarged horizontal cross-section, taken substantially on the line 9—9 of FIGURE 8.

FIGURE 10 is a top plan view partly broken away of a modified form of tire mounting tool, adapted to be provided as a separate unit for use with existing tire-changing equipment including a wheel supporting stand.

FIGURE 11 is a fragmentary front elevation of the left end portion of FIGURE 10.

FIGURE 12 is an end elevation, as viewed from the left end of FIGURE 10.

Figure 13:
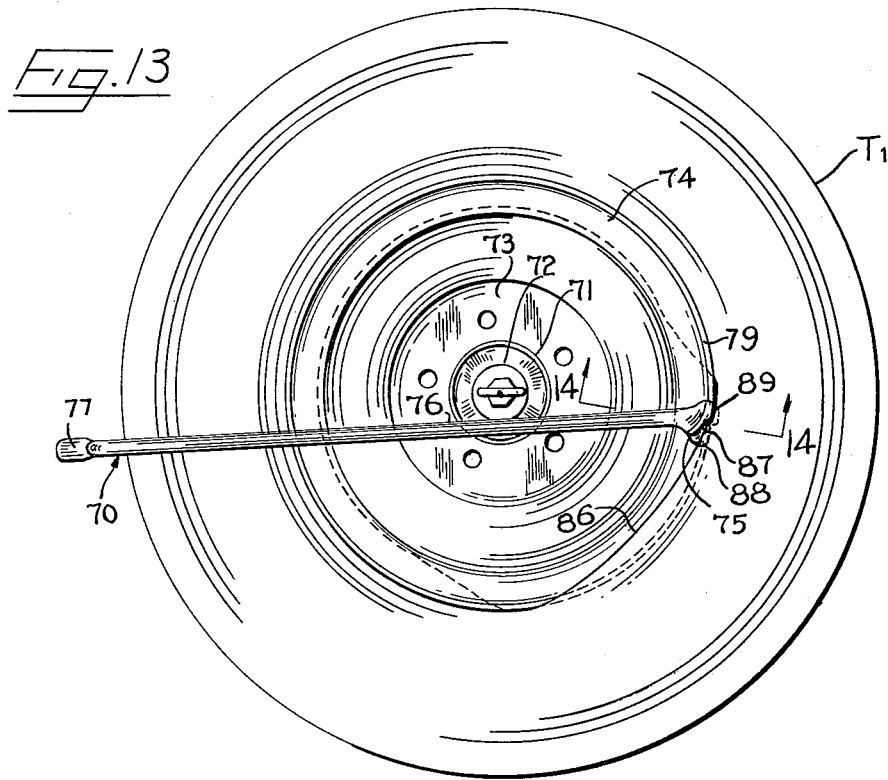

FIGURE 13 is a top plan view corresponding to FIGURE 3, illustrating use of the tool shown in FIGURES 10, 11 and 12 for mounting a tire on the wheel rim.

Figure 14:
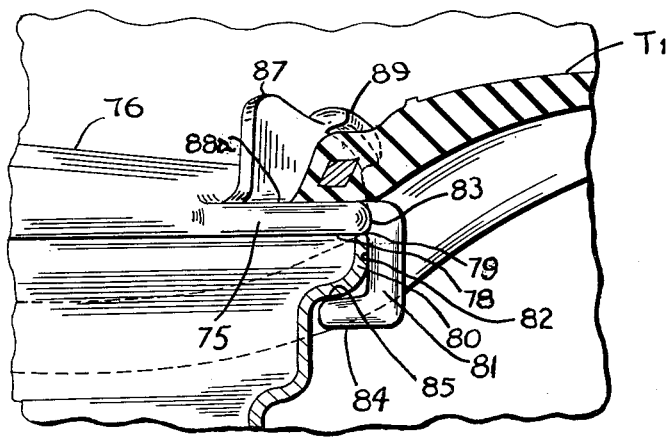

FIGURE 14 is an enlarged fragmentary cross-section, taken substantially on the line 14—14 of FIGURE 13, and illustrating the position in which the tire bead is being guided over the rim flange in a manner corresponding to the illustration of FIGURE 3.

FIGURE 15 is a top plan view, partly broken away and in section, illustrating a portion of the equipment best shown in FIGURES 1 and 2 with improved means for breaking the tire bead away from the rim flange thereof for a tire demounting operation.

FIGURE 16 is a vertical cross-section taken substantially on the line 16—16 of FIGURE 15.

FIGURES 17 and 18 are fragmentary views corresponding to FIGURES 10 and 11, respectively, illustrating a modified form of the tool shown therein.

Referring generally to FIGURES 1 to 9, and to FIGURES 1 to 7 in particular, the numeral 20 designates a vehicle wheel of known type, including a drop-center rim 21 welded or otherwise permanently secured to a centrally apertured disc or hub plate 22. The wheel 20 is shown fixedly supported in horizontal position on the upper end of a tubular post 23 of a tire changing stand 24, as for mounting a tubeless tire T in drop-center rim 21.

For removably mounting the wheel 20 on post 23, a separate adaptor unit 25 is provided, as best shown in FIGURES 2, 8 and 9. This adaptor unit includes a part 26 having a reduced tubular portion 27 snugly receivable within the upper end of the post 23, and defining an annular seat 28 for stop engagement with the top edge of the post. The upper portion of part 26 flares upwardly in hollow conical shape to an annular flange 30 presented in a horizontal plane, said flange providing seat means for hub plate 22. A pivoted pin 32 is radially pivotally adjustable on flange 30 for reception in one of the usual peripherally spaced bolt holes 33 in the hub 22, thereby to prevent relative rotation of the wheel with respect to the adaptor part 26. Vertically slidably, and relatively rotatably received in the reduced portion 27 of part 26, may be a hollow cylindrical adaptor part 34 having integral therewith an annular flange 35, which converges downwardly for self-centering engagement with the usual hub aperture 36 of wheel plate 22. For self-centeringly clamping the wheel plate between the conical flange 35 and seating flange 30, a rod 37 vertically slidably received through the cylindrical part 34 has a nut 38 threaded on its upper end, the rod being supported by the nut engaging the top end wall of the cylindrical part 34. A lug or tang 39 affixed on the lower end of rod 37 is axially slidably but non-rotatably received in a narrow guide recess 40 in a bottom wall 41 of part 34, thereby to prevent rotation of the rod with respect to said part 34. The lower end of the rod 37 has thereon a short, right-angularly disposed extension 42, which is engageable under a pin 43 fixedly mounted through post 23 at a point offset with respect to the vertical axis of the post.

In other words, by turning the cylindrical part 34 with respect to adaptor part 26, the rod 37 is also turned for engaging and disengaging the hook part 42 of the rod with respect to the pin 43. Thus, by turning the nut 38 against the upper end of part 34, to urge the hook 42 against the pin 43, the conical flange 35 clampingly and self-centeringly urges the wheel plate 22 downwardly into relatively fixed seating relation on the seat 30. Nut 38 is provided with a manual turning handle 44 which does not extend beyond a diameter equal to the outside diameter of cylindrical part 34, for purposes to be described later. It will be seen that the adaptor unit 25 may be used on tire changing stands of various existing types other than shown in the drawings.

For mounting a tire T in the rim 21, there is provided a tire bead guiding tool 46 which is swingable or movable in a fixed radius about the cylindrical adaptor part 34. Accordingly, the tool 46 may include a relatively thin, elongated generally ovate base plate or shoe 47, having spaced smooth surface portions 48, 48 on the under side thereof for smooth sliding engagement with the annular edge portion 49 of the uppermost rim flange 21a. The base 47 has centrally thereof an integral upstanding shank 50 from which extends radially inwardly an integral arm part 51, which is non-rotatably telescopically received in a hollow arm part 52 extending radially outwardly from a cylindrical sleeve 53, in turn rotatably received on the cylindrical adaptor part 34. The sleeve 53 is free to slide vertically on part 34 except as it is limited in downward movement by the shoe 46 resting on the edge 49 of the rim. The arm part 51 is limited in its sliding telescopic movement with respect to arm part 52 by the end of at least one set screw 54 in part 52 engaging in an elongated slot 55 in part 51. Radially inward telescopic movement of arm 51 is also limited by provision of a downturned tang 56 at the trailing end of plate 47, which tang is held in engagement with the radially outermost portion of the rim flange 49 by the corresponding tire bead B during tire-mounting operations to be described later. The upstanding shank 50 has an upward extension 57 on which is an integral, radially extending sleeve 58 providing a socket for an elongated cylindrical bar 59 adapted to extend radially outwardly of the sleeve 58 for manual turning of the tool 46 on the adaptor part 34.

The shoe 47 is designed to engage the bead of the tire T during the process of mounting the tire in a drop-center rim, and progressively to urge the bead around or radially inwardly of the edge 49 of rim flange 21a, toward the deep central part of the rim, but without scuffing contact with the edge of the rim which would otherwise damage the air-sealing portions of the tire bead. Accordingly, at the leading end of shoe 47 an integral upstanding wall portion 61 provides an arcuate guide surface 62 facing forwardly of said leading end, and curving radially outwardly to blend with a curved outer edge 63 of shoe 47, which in the operative condition of the tool is coextensive or flush with the axially outermost edge of the rim flange (see FIGURES 1 to 4, and 6). The leading end of shoe 47 is extended forwardly to provide a relatively thin nose portion 64, defined by a peripherally curved or rounded edge 65, the outer portion of which blends smoothly into the curved outer edge 63 of the base plate. The upper surface 66 of nose portion 64 is substantially convex and joins at the juncture with wall surface 62 in a smooth radius or fillet 67, and further blends with a smaller radius along the edge 65. Thus, the smoothly rounded surfaces of the nose portion 64 and the arcuate wall face 62 form a dihedral angle converging rearwardly of the nose to blend with the arcuate outer edge 63 at a point slightly forwardly of the axis of radial arm part 51.

In operation of the equipment shown in FIGURES 1 to 9, it is to be assumed that the lowermost bead of tire T already has been mounted in the drop-center rim, as shown in FIGURE 2, in a manner to be described for mounting the uppermost tire bead from the position shown in FIGURE 2 to a condition in which it is fully received between the two rim flanges. That is, initially a portion of the bead will be engaged over the rim flange 49 while the opposite portion of the bead overhangs the corresponding outer edge portion of the rim flange. As the inside diameter of the bead is smaller than the maximum diameter of the rim flange, the problem is to force all of the tire bead axially inwardly past the rim flange without damaging the bead.

Accordingly, with the tire T initially in the position shown in FIGURE 2, the operator presses the right hand side of the upper sidewall of the tire downwardly to position the upper bead somewhat below the corresponding portion of rim flange 49 and then, by operation of the lever 59 in clockwise direction as viewed in FIGURE 1, the shoe 47 is moved in a circular path toward engagement of the edge of the bead across the nose portion 66 and in substantial conformity with at least a portion of the curved wall surface 67, substantially as shown in FIGURES 3 to 6. Thus, pressure of the bead against the shoe 47 will hold the same in stop engagement of the tang 56 thereof with the rim flange 49, as permitted by the self-adjusting telescopic connection between arm parts 51 and 52. By continuing this clockwise movement of the shoe 47, in sliding engagement with the edge 48 of the rim, the tire bead will be urged outwardly and upwardly out of scuffing contact with the edge 48 of the rim and fed rearwardly under the rim flange, substantially as shown in FIGURES 3 and 7. This clockwise movement of the guide shoe 47 will progressively urge the remaining portions of the tire bead inwardly across the edge of the rim flange, without substantially contacting same, until the entire bead is in position for subsequent positioning of both beads in the respective rim seats in known manner.

When it is desired to remove the wheel and tire assembly from tire stand 24, the operator first removes the tire bead guiding tool 46, by sliding the sleeve 53 thereof upwardly of adapter part 34, and over the nut handle 44. The operator may then remove the adaptor unit by turning the nut 38 to relieve the clamping pressure of conical flange 35 with respect to the wheel plate 22, thereby enabling him to turn adaptor part 34 and with it the hook extension 42 to release the latter from under the cross pin 43, so that the adaptor part 34 then may be lifted from the adaptor part 26. With the adaptor part 34 removed, the wheel 20 may be lifted from seating position on adaptor seat 30.

Referring to the form of the invention illustrated in FIGURES 10 to 14, there is illustrated a one-piece lever type of hand tool 70, for use on an existing tire-supporting unit or stand 71, having substantially any kind of rigid post extension 72 projecting through wheel hub 73. FIGURE 13 shows a tire partially mounted on a drop-center rim 74 at a stage corresponding to that previously described in connection with FIGURE 3.

The hand tool 70 includes the bead guiding shoe 75, corresponding to the shoe 47 of FIGURES 4 and 5, the shoe 75, however, being integrally formed on one end of an elongated lever bar 76 which has integrally formed to its other end a suitable tire demounting lip 77.

The shoe 75 has a smooth flat underside 78 providing rim seating means for sliding engagement with the outer edge 79 of rim flange 80, and has a downturned lug or extension 81 for stop engagement with the radially outermost portion 82 of the rim flange when the bar 76 is extended substantially diametrically across the rim, as shown in FIGURE 13, and as will be described later. In this last-named position an arcuate outer edge 83 of the shoe is coextensive or flush with the outer peripheral edge 82 of rim flange 80. Lug 81 has an inturned lip 84 for engagement with the corresponding inner portion 85 of the rim flange, to prevent the shoe from being lifted away from the rim by an inherent tendency of the taut portion 86 of the tire bead to pull away from the rim flange, as in the condition illustrated in FIGURE 13. For guiding said taut portion of the bead around the peripheral edge 79 of the rim flange, an arcuate bead-urging face or wall portion 87 is provided on the upper face of the shoe 75, an upwardly presented convex guide face 88a on said shoe forming a dihedral angle with arcuate bead-urging face 87, and the juncture of these two faces converging rearwardly from a leading edge of substantial breadth to blend with the arcuate edge 83 at the trailing end of the shoe. All surfaces or faces which are contacted by the tire bead are smoothly rounded so that there will be a minimum of frictional resistance between the same and the tire bead.

Shoe 75 is made relatively small, as shown, to minimize the weight of the tool for ease of handling in mounting a tire, and it has been found that the tool functions smoothly and with a minimum of effort in actual use if the retaining lug 81 is centrally of the arcuate wall portion 87. In view of the compactness of the shoe 75, an outturned lug or lip 89, of substantial width, may extend from the trailing end of arcuate wall 87, at a point spaced above the corresponding end portion of surface 88, said lip being adapted to be engageable by the tire bead portion 86 in the relative position shown in FIGURE 14, to prevent the bead from accidentally slipping over and behind arcuate wall 87.

In use of the tool 70 to mount a tire T-1 on a drop-center rim 74, the wheel and rim assembly is clamped on a tire stand of the type previously described but not necessarily the same as that shown in FIGURE 2, to support the wheel in horizontal position. In any event, the tire stand should have an upward central post extension 72, against which the lever handle 76 may be fulcrumed substantially as shown in FIGURE 13, while the shoe 75 is maintained in the operative position shown in FIGURE 14 by the inherent resilient pressure of the taut portion 86 of the tire bead. As previously described in connection with FIGURES 1 to 9, the lever while held in the FIGURE 13 position may be fulcrumed against the post extension 72 to urge the shoe around the rim in clockwise direction, thereby to guide the bead between the surface portions 87 and 88 of the shoe, around the peripheral edge of the rim flange 82, without substantial scuffing contact therewith which would tend to damage the tire bead. This movement of the shoe is continued until the entire taut portion 86 of the bead has been urged across and under said peripheral edge of the rim. As before, it has been assumed that the lowermost bead of the tire has been previously positioned between the rim flanges by a similar procedure.

FIGURES 17 and 18 illustrate a modification of shoe 47 of the previously described bead-mounting tool particularly as shown in FIGURES 4 and 5, respectively. This modification contemplates provision of an outwardly projecting lip 89a along the upper edge of the arcuate guide wall 61a. The purpose of lip 89a is to prevent the tire bead from accidentally slipping over and behind arcuate wall, precisely in the manner of lug 89 described in connection with FIGURES 10 to 12. Lip 89a may extend substantially the full length of wall 87a, as shown, or it may extend along only a part of the length of the wall as best shown in FIGURES 10 and 12. Like parts in both related forms of the device are otherwise designated by like numerals.

Referring to FIGURES 15 and 16, there is illustrated bead breaking or loosening equipment 90 which may be a part of the tire stand 24, as best shown in FIGURE 2. Equipment 90 includes a lever 91 connected by adjustable pivot means 92 to a bifurcated lug 93, extending from a collar 94 which is affixed vertically slidable on an upright post 23. Collar 94 may be vertically slidable to selective positions of vertical adjustment in which it is affixed to the post 23 by wedging action induced by pressure or load applied at one side of the post through pivot means 92.

The lever 91 is arranged to be swung on pivot means 92 in a vertical plane and has an arm 95 depending from a pivot 96 on lever 91 in spaced relation to the pivot means 92, and the lower end of arm 95 has an arcuate bead-breaking member 66a affixed thereon. Member 66a is shown formed of angle material to have one curved flange 97 downwardly engageable with the bead portion of the tire T-2 and contiguous with the outer edge of the rim flange, while the other angularly disposed flange 98 is engageable with the tire sidewall at a point spaced from said edge of the rim flange, substantially as shown in FIGURE 16.

The adjustable pivot means 92 may comprise a pin or bolt 99 extended through the lever 91 and outwardly arcuate, aligned slots 100 in the bifurcations of lug 93. The arrangement is such that the pin 99 may be selectively positioned at one or other of vertically spaced ends of the aligned arcuate slots 100 for pivoting lever 91 according to the requirements for breaking the beads on rims of varying widths. Thus, it will be seen that vertical adjustments may be made to accommodate rims within a very wide range of widths through either the adjustable pivot means 92 or the slidable collar 94, or both.

For properly positioning the work with respect to the equipment 90, the wheel with the tire T-2 thereon is placed flatly upon a base 104 with the edge portion 103 of the rim flange nearest post 23 engaged over a pin 102 which is affixed on the base 104. Pin 102 prevents radially outward movement of the wheel during bead-breaking operations.

In use of the equipment 90 shown in FIGURES 15 and 16, to break the tire bead from the usual tight adhesion of its seat in a safety or conventional type rim R, while the rim is positioned on base 104 as shown, the operator, after adjusting collar 94 and/or pivot means 92, manually guides the arcuate member 96 to a position in which member flange 97 engages both outer edge 103 of the rim flange and the corresponding portion of the tire bead, and the flange 98 engages the sidewall at a point outwardly adjacent said edge of the rim flange. In this position of member 66a the arm 95 extends at an inclination to the horizontal so that continued pressure on handle lever 91 tends to hold the member 66a firmly in desired tire-engaging position to urge the bead away from its rim seat.

Other modifications of the invention may be resorted to without departing from the spirit or scope of the appended claims.

What is claimed is:

1. A tire tool as for mounting a pneumatic tire casing on a wheel having at least one flange of the rim terminating in an axially outwardly presented peripheral edge while the wheel is supported on a relatively fixed supporting device including a rigid axially extending central member, comprising a tire bead-engaging element having leading and trailing ends and top and bottom sides, said bottom side adapted to be in sliding engagement with said peripheral edge of the rim, said element having an arm affixed thereon to extend radially inwardly thereof for fulcruming connection with the central member to slide the element around said peripheral edge, and turning means for fulcruming said arm on said central member, said top side having an axially outwardly presented convex guide face of a substantial breadth extending to a radially outwardly presented outer portion to be substantially coextensive with said peripheral edge, said element having on the top side thereof a wall providing a radially outwardly presented arcuate bead-urging face generally at a dihedral angle to said guide face of said element, said bead-urging face being divergent from said outer portion toward said leading end, said element having a downturned angular extension from said outer portion thereof engageable with the radially outwardly presented portions of the rim flange to limit radially inward movement of the element upon yielding engagement of tire bead with said bead-urging face.

2. A tire tool as for mounting a pneumatic tire casing on a wheel having at least one annular flange of the rim terminating in an axially outwardly presented peripheral edge while the wheel is supported on a relatively fixed supporting device including a rigid axially extending central member, comprising a tire bead-engaging element having top and bottom sides, said bottom side adapted to be in sliding engagement with said peripheral edge of the rim, said element having a rigid elongated lever arm affixed thereto and extending therefrom generally in a direction which would be radially of the tire casing and the central member for free fulcruming engagement of the arm as a lever against the central member to slide the element in a circular path around said peripheral edge, said top side having an axially outwardly presented convex guide face of substantial breadth extending to a radially outwardly presented outer portion to be arcuately substantially coextensive with said peripheral edge, said element having on the top side thereof an arcuate wall providing a radially outwardly presented bead-urging face generally at a dihedral angle to said guide face of the element, said bead-urging face being divergent from said outer portion.

References Cited in the file of this patent

UNITED STATES PATENTS

| | | |
|---|---|---|
| 1,025,987 | Long | May 14, 1912 |
| 1,187,815 | Clinton | June 20, 1916 |
| 1,716,882 | Freivogel | June 11, 1929 |
| 2,378,955 | Teegarden | June 26, 1945 |
| 2,418,849 | Polt | Apr. 15, 1947 |
| 2,439,615 | Smith | Apr. 13, 1948 |
| 2,505,172 | Coats | Apr. 25, 1950 |
| 2,523,979 | Weeks et al. | Sept. 26, 1950 |
| 2,655,985 | Henderson | Oct. 20, 1953 |
| 2,672,184 | Bergeron | Mar. 16, 1954 |
| 2,695,659 | Athmann | Nov. 30, 1954 |
| 2,708,954 | Schultz | May 24, 1955 |
| 2,772,726 | Mercaldo | Dec. 4, 1956 |
| 2,808,860 | Hildebrant | Oct. 8, 1957 |
| 2,925,857 | Twiford | Feb. 23, 1960 |

FOREIGN PATENTS

| | | |
|---|---|---|
| 246,853 | Great Britain | May 6, 1926 |
| 456,097 | France | Aug. 16, 1913 |